US008880681B2

(12) United States Patent  
Moncaster et al.

(10) Patent No.: US 8,880,681 B2  
(45) Date of Patent: Nov. 4, 2014

(54) NETWORK CHARACTERISATION

(75) Inventors: Tobias Moncaster, Colchester (GB); Robert J Briscoe, Woodbridge (GB); Arnaud Jacquet, Ipswich (GB); Alessandro Salvatori, San Jose, CA (US)

(73) Assignee: British Telecommunications public limited company, London (GB)

( * ) Notice: Subject to any disclaimer, the term of this patent is extended or adjusted under 35 U.S.C. 154(b) by 1087 days.

(21) Appl. No.: 12/812,717

(22) PCT Filed: Jan. 14, 2009

(86) PCT No.: PCT/GB2009/000103  
§ 371 (c)(1), (2), (4) Date: Sep. 29, 2010

(87) PCT Pub. No.: WO2009/090387  
PCT Pub. Date: Jul. 23, 2009

(65) Prior Publication Data  
US 2011/0016209 A1 Jan. 20, 2011

(30) Foreign Application Priority Data  
Jan. 14, 2008 (EP) .................................... 08250161

(51) Int. Cl.  
*G06F 15/173* (2006.01)  
*H04L 12/26* (2006.01)  
*H04L 12/833* (2013.01)  
*H04L 12/823* (2013.01)  
*H04L 29/06* (2006.01)  
*H04L 12/801* (2013.01)

(52) U.S. Cl.  
CPC ............... *H04L 47/31* (2013.01); *H04L 43/08* (2013.01); *H04L 47/35* (2013.01); *H04L 43/0852* (2013.01); *H04L 47/10* (2013.01); *H04L 47/11* (2013.01); *H04L 47/32* (2013.01); H04L 2212/0025 (2013.01); *H04L 69/16* (2013.01); *H04L 69/22* (2013.01); *H04L 69/161* (2013.01)  
USPC ............................ 709/224; 709/232; 370/229

(58) Field of Classification Search  
CPC ..... H04L 47/11–47/115; H04L 47/25–47/266; H04L 47/31; H04L 47/33; H04L 47/35–47/365; H04L 43/08–43/0894; H04L 65/40; H04L 69/167

USPC .......................... 709/223–235; 370/229–239  
See application file for complete search history.

(56) References Cited

U.S. PATENT DOCUMENTS

| 5,426,640 | A | 6/1995 | Hluchyj et al. | |
|---|---|---|---|---|
| 6,996,626 | B1 * | 2/2006 | Smith | ........................... 709/232 |

(Continued)

FOREIGN PATENT DOCUMENTS

| WO | 03/049319 | 6/2003 |
|---|---|---|
| WO | 2005/006626 | 1/2005 |
| WO | 2006/079845 | 8/2006 |

OTHER PUBLICATIONS

Adler, Micah, et al. "Estimation of congestion price using probabilistic packet marking." INFOCOM 2003. Twenty-Second Annual Joint Conference of the IEEE Computer and Communications. IEEE Societies. vol. 3. IEEE, 2003.*

(Continued)

*Primary Examiner* — Patrice L Winder  
*Assistant Examiner* — Julian Chang  
(74) *Attorney, Agent, or Firm* — Nixon & Vanderhye P.C.

(57) ABSTRACT

Methods and systems for assigning information indicative of a network characteristic to one of a plurality of data units traversing a path across a network, said data units having associated therewith values indicative of said network characteristic, said path having at least one portion passing through a lower-capability region and at least one portion passing through a higher-capability region, said lower-capability region being a region in which information indicative of said network characteristic may be represented by values having a first resolution, and said higher-capability region being a region in which information indicative of said network characteristic may be represented by values having a second resolution, said second resolution being greater than said first resolution, said one data unit being a data unit entering said higher-capability region.

20 Claims, 6 Drawing Sheets

(56) References Cited

U.S. PATENT DOCUMENTS

| | | | | |
|---|---|---|---|---|
| 7,668,968 | B1* | 2/2010 | Smith | 709/234 |
| 2002/0186657 | A1* | 12/2002 | Jain et al. | 370/235 |
| 2002/0193118 | A1* | 12/2002 | Jain et al. | 455/453 |
| 2003/0135638 | A1* | 7/2003 | Brabson et al. | 709/232 |
| 2005/0018617 | A1* | 1/2005 | Jin et al. | 370/252 |
| 2005/0063458 | A1* | 3/2005 | Miyake et al. | 375/235 |
| 2005/0164709 | A1* | 7/2005 | Balasubramanian et al. | 455/453 |
| 2006/0030345 | A1* | 2/2006 | Jain et al. | 455/515 |
| 2007/0195698 | A1* | 8/2007 | Briscoe et al. | 370/235 |
| 2007/0230352 | A1* | 10/2007 | Kokku et al. | 370/238 |
| 2008/0025217 | A1* | 1/2008 | Gusat et al. | 370/232 |
| 2008/0091766 | A1* | 4/2008 | Briscoe et al. | 709/202 |
| 2008/0240115 | A1* | 10/2008 | Briscoe et al. | 370/400 |
| 2008/0304413 | A1* | 12/2008 | Briscoe et al. | 370/235 |
| 2009/0113069 | A1* | 4/2009 | Prabhakar et al. | 709/235 |
| 2010/0034090 | A1* | 2/2010 | Bader et al. | 370/236 |
| 2011/0016209 | A1* | 1/2011 | Moncaster et al. | 709/224 |
| 2012/0294149 | A1* | 11/2012 | Kazmi et al. | 370/235 |

OTHER PUBLICATIONS

Lapsley, David, and Steven Low. "Random Early Marking: an optimisation approach to Internet congestion control." Networks, 1999.(ICON'99) Proceedings. IEEE International Conference on. IEEE, 1999.*

Andrew, Lachlan LH, et al. "Efficient deterministic packet marking." 2006.*

Andrew, Lachlan LH, et al. "Adaptive deterministic packet marking." Communications Letters, IEEE 10.11 (2006): 790-792.*

Floyd, Sally. "TCP and explicit congestion notification." ACM SIGCOMM Computer Communication Review 24.5 (1994): 8-23.*

Touch, Joe. "Dynamic Internet overlay deployment and management using the X-Bone." Computer Networks 36.2 (2001): 117-135.*

International Search Report (2 pgs.) issued in International Application No. PCT/GB2009/000103 dated May 6, 2009.

Extended European Search Report (3 pgs.) issued in European Application No. 08250161.0 dated Jun. 11, 2008.

L. Andrew and S. Hanly, "The Estimation Error of Adaptive Deterministic Packet Marking", 44th Allerton Conf. on Communication, Control and Computing, 2006. http://netlab.caltech.edu/lachlan/abstract/ADPM_Allerton06.pdf.

R.W. Thommes and M.J. Coates, "Deterministic packet marking for time-varying congestion price estimation". IEEE/ACM Transactions on Networking. vol. 14-3 (592-602). Jun. 2006. http://ieeexplore.ieee.org/stamp/stamp.jsp?tp=&arnumber=1642738&userType=inst.

S. Kent and K. Seo, "Security Architecture for the Internet Protocol", RFC 4301, Dec. 2005. http://tools.ietf.org/pdf/rfc4301.pdf.

B. Briscoe, A. Jacquet, C. Di Cairano-Gilfedder, A. Salvatori, A. Soppera and M. Koyabe. "Policing Congestion Response in an Internetwork using Re-feedback", In Proc ACM SIGCOMM'05, Computer Communications Review 35(4) (Sep. 2005). http://bob-briscoe.net/projects/refb_sigcomm05.pdf.

I.Y. Xia, L. Subramanian, I. Stoica, and S. Kalyanaraman. "One more bit is Enough". In Proc ACM SIGCOMM'05, Computer Communications Review 35(4) (Sep. 2005). http://conferences.sigcomm.org/sigcomm/2005/paper-XiaSub.pdf.

K. Ramakrishnan, S. Floyd and D. Black, "The Addition of Explicit Congestion Notification (ECN) to IP ", RFC 3168, Sep. 2001. http://www.rfc-editor.org/rfc/rfc3168.txt.

S. Floyd and V. Jacobson, "Random Early Detection gateways for Congestion Avoidance", IEEE/ACM Transactions on Networking, vol. 1-4 (397-413) Aug. 1993. http://portal.acm.org/citation.cfm?id=169935.

Bob Briscoe (BT), "Layered Encapsulation of Congestion Notification", IETF I-D (Jun. 2007). <draft-briscoe-tsvwg-ecn-tunnel-00.txt> http://tools.ietf.org/html/draft-briscoe-tsvwg-ecn-tunnel-00.

B. Davie, B. Briscoe and J. Tay, "Explicit Congestion Marking in MPLS", IETF I-D, Jun. 2007. <draft-ietf-tsvwg-ecn-mpls-00> http://tools.ietf.org/html/draft-ietf-tsvwg-ecn-mpls-00.

International Search Report for PCT/GB2009/000103, mailed May 6, 2009.

* cited by examiner

NETWORK CHARACTERISATION

This application is the U.S. national phase of International Application No. PCT/GB2009/000103 filed 14 Jan. 2009, which designated the U.S. and claims priority to European Application No. 08250161.0, filed 14 Jan. 2008, the entire contents of each of which are hereby incorporated by reference.

TECHNICAL FIELD

The present invention relates to network characterisation. More specifically, aspects of the present invention relate to methods and apparatus for assigning information indicative of a network characteristic such as congestion to a data unit traversing a path across a network.

BACKGROUND TO THE INVENTION AND PRIOR ART

As the characteristics of networks change, it is necessary to introduce new ways to control how network resources are allocated between end-users. Some such new mechanisms require all routers on a communication path to support a given new function (e.g. a specific ways of signalling path characterisation). The overall mechanism would not be effective unless every router on the network path supports the new function. This can only be achieved gradually, through incremental deployment. The default way to achieve this would be to upgrade every router in turn so they support the new function. However this can be a time-consuming, costly process.

Using a basic network model where all paths would have the same length "d", and each node in the network would have the same probability "r" to provide the new function, the probability that an end-to-end path supports the new function is $P=(r)^d$.

Consider a path of 20 routers. At the start of the incremental deployment, if r=10%, then $P=1.0\ E^{-20}$: hardly any paths would support the new function. Even if r=90%, only about 12% of paths would support the function. Even if r=99%, still only 82% of paths support the function.

Any mechanism that speeds up incremental deployment can boost significantly the speed of adoption of a new functionality in a network.

We start by presenting the basic concept to facilitate the understanding of the mechanisms that are presented further on.

Packets

Data networks often split the data they carry into small units known as packets. Each communication protocol required to carry the information across the Internet adds a header that contains suitable information for the data exchange between the end hosts (usually a source host and a destination host) to be carried out appropriately. In the internet, one of the most common types of packet consists of a payload that contains the data generated by the application running at the source, encapsulated by a TCP header which ensures reliable delivery of the data, encapsulated again by an IP header, which ensures that the data reaches the destination host for which it is aimed. As a result, the TCP header contains a sequence number among other things, and the IP header contains the IP address of the destination host.

Distributed Bandwidth Sharing

Data travelling across the Internet follows a sequence of routers that constitutes the communication path from the source to the destination. Now, if many paths need to use a same router in the network, this router can get congested (packets experience delays for using that network). It would get overloaded and could fail if sources persist in sending traffic through that router. If sources still persist sending traffic around this bottleneck it could force more routers around to fail, and if the phenomenon keeps spreading, that could lead to a congestion collapse for the whole Internet—which occurred regularly in the mid-eighties.

The solution to that problem has been to ensure that sources take charge of the rate at which they send data over the Internet, by implementing congestion control mechanisms. Sources monitor path characterisation metrics to detect when the path their data is following is getting congested, in which case they react by reducing their throughput. They may slowly increase it again when there is no sign of the path being congested.

The typical path characterisation metrics sources monitor are the average round-trip time for the data path, the variance of the round-trip (jitter), and the level of congestion on the path, which is the primary parameter influencing the data rate adaptation of a source sending data over a congested path.

The congestion level can be signalled implicitly or explicitly. To this day, the most common option has been implicit signalling. Initially, routers would drop packets when they got completely saturated (which can always happen when a traffic burst cannot be accommodated in the buffer of the router)—this policy is called "Droptail". An improvement has been proposed where congested routers monitor the average queue length in their buffer, and when the average queue is higher than a given threshold, the routers starts to drop packets with a probability which increases with the excess length of the queue over the threshold—this policy is called Random Early Detection (RED). It is widely used in today's internet because it allows sources to react more promptly to incipient congestion. Sources using TCP are able to detect losses, because a packet loss causes a gap in the sequence; whenever a source detects a loss, it halves its data rate, which alleviates the congestion on the router at the bottleneck.

Explicit Congestion Notification (ECN) [ECN] further improves on RED by using a two-bit ECN field in the IP header to signal congestion. It runs the same algorithm as RED, but instead of dropping a packet, it sets its ECN field to the Congestion Experienced (CE) codepoint.

The three other values of the two-bit ECN field are:
Non ECT, which signifies that the packet belongs to a flow that doesn't support ECN
ECT(0) and ECT(1), which signify that the packet belongs to a flow that supports ECN but that upstream routers haven't had to mark the packet.

The ECN standard requires, the sender to echo any congestion mark signalled in the data; for instance, a TCP receiver sets the Echo Congestion Experienced (ECE) flag in the TCP header, which the TCP source interprets—for the purpose of its rate control—as if the packet has been dropped.

As the bandwidth required by applications and provided by networks keeps increasing, there is an ever more important need to develop suitable mechanisms for high-speed congestion control. It is now being argued that richer congestion information would help provide more robust congestion control mechanisms for the Internet [Stoics, Briscoe, Lachlan, Thommes].

Specific proposals have been put forward as to how such an encoding should be achieved. For instance the re-feedback proposal [Briscoe05c] suggests using a multi-bit congestion field which could effectively contain a floating-point representation of the congestion level, which each router on the path would update with its own local congestion level.

IP Tunnels

In the context of a data network, tunneling consists of encapsulating one protocol inside another protocol, and aims to improve the network service, for instance in terms of connectivity (it allows data to get across a network it couldn't get across otherwise), of security (the data is encrypted so it cannot be used if it is intercepted), etc.

A special case of IP tunnels are IP-in-IP tunnels where the original header is retained intact and is simply encapsulated in another standard IP header, at the entrance of the tunnel. The outer IP header source and destination addresses identify the "endpoints" of the tunnel while the inner header preserves the original source and destination addresses for the packet. As the packet traverses the tunnel, the outer header may be modified as the header of any other packet on the same path. When the packet reaches the other end of the tunnel, decapsulation occurs: the outer header is stripped off, the original header fields are updated if necessary, and the packet is forwarded to its originally-specified destination.

Tunnel End-Point Discovery (TED)

In order to use IP encapsulation tunnels it is necessary to establish the endpoints of the tunnel. This can be done manually by a user with explicit knowledge of the endpoints and sufficient permissions to be able to manipulate the routers appropriately. Alternatively it can be done using Tunnel Endpoint Discovery (TED) as described in the specifications of the IPsec protocol [IPsec]. Upon receiving a packet that needs to be encapsulated, the tunnel ingress will hold or drop this packet and create a TED packet with its own address as source address and the destination address of the initiating packet as destination address. The tunnel ingress then sends the packet as if it were a normal packet. When the packet reaches a node at the other end of the encapsulation region, this node declares itself as the egress node for the tunnel by sending back a packet with its address as the source and the address of the tunnel ingress as the destination.

EWMA

Finally, a classic way to monitor the evolution of a dynamic parameter is to use an Exponentially Weighted Moving Average (EWMA). We consider "$x_i$" as the observed signal, "$y_i$" as the resulting average, and "w" as the weight. Whenever a new value of the signal is observed, the average is updated according to the following algorithm:

$$y_{i+1} = (1-w) \cdot y_i + w \cdot x_{i+1} = y_i \cdot w \cdot (x_{i+1} - y_i)$$

The two parameters to be set are the weight, w, and the initial seed for the average, $y_0$. The long term value of $y_{i+1}$ doesn't depend on the initial seed $y_0$.

In the context of binary signalling (which is the case when congestion is signalled by drops or by ECN marks), with $m_i$ the value of the binary mark, the algorithm can be written as:

If $m_{i+1}=1$: $y_{i+1}=y_i+(1-y_i)\cdot w$ else: $y_{i+1}=(1-w)\cdot y_i$

Congestion Signalling and Traffic Tunneling

Congestion signalling has been well documented in many forms: whether it is by using an implicit signal [RED], an explicit binary signal [ECN] or an explicit multi-bit signal [ref]. The generic aspects of traffic tunneling have also been documented in standard documents, for instance "IP Encapsulation within IP" [RFC 2003] for IP-in-IP tunnels. [Briscoe07] reviews best practice for handling binary congestion marking in tunnels, by building on the recommendations available in the ECN and IPsec RFCs [ECN, IPsec] and in the IETF Internet Draft on "Explicit Congestion Marking in MPLS" [DBT07].

REFERENCES

[Lachlan]: L. Andrew and S. Hanly, "The Estimation Error of Adaptive Deterministic Packet Marking", 44th Allerton Conf. on Communication, Control and Computing, 2006.

[Thommes]: R. W. Thommes and M. J. Coates, "Deterministic packet marking for time-varying congestion price estimation". IEEE/ACM Transactions on Networking. Vol. 14-3 (592-602). June 2006.

[IPsec]: S. Kent and K. Seo, "Security Architecture for the Internet Protocol", RFC 4301, December 2005.

[Briscoe05c]: B. Briscoe, A. Jacquet, C. Di Cairano-Gilfedder, A. Salvatori, A. Soppera and M. Koyabe. "Policing Congestion Response in an Internetwork using Re-feedback". In Proc ACM SIGCOMM'05, Computer Communications Review 35(4) (September 2005).

[Stoica]: I. Y. Xia, L. Subramanian, I. Stoica, and S. Kalyanaraman. "One more bit is Enough". In Proc ACM SIGCOMM'05, Computer Communications Review 35(4) (September 2005).

[ECN]: K. Ramakrishnan, S. Floyd and D. Black, "The Addition of Explicit Congestion Notification (ECN) to IP", RFC 3168, September 2001.

[RED]: S. Floyd and V. Jacobson, "Random Early Detection gateways for Congestion Avoidance", IEEE/ACM Transactions on Networking, Vol 1-4 (397-413) August 1993.

[Briscoe07]: Bob Briscoe (BT), "Layered Encapsulation of Congestion Notification", IETF I-D (June 2007). <draft-briscoe-tsvwg-ecn-tunnel-00.txt>

[DBT07]: B. Davie, B. Briscoe and J. Tay, "Explicit Congestion Marking in MPLS", IETF I-D, June 2007. <draft-ietf-tsvwg-ecn-mpls-00>

Prior Patent Documents

International patent application WO 2006/079845 relates to control of data in a network, and in particular to methods and apparatus for characterising the path traversed by data through a network where each node characterises its local part of the path and then all the local characterisations are accumulated in the data as it passes. In particular it discloses methods and apparatus for encoding a number of small dynamic values over an n-bit field, generally where n is greater than 1.

International patent application WO 2003/049319 relates to a method of resource control for use within a wireless network, and in particular to a method of resource control wherein congestion pricing is used to determine resource allocation between multiple users.

SUMMARY OF THE INVENTION

According to a first aspect of the present invention, there is provided a method for assigning information indicative of a network characteristic to one of a plurality of data units traversing a path across a network, said data units having associated therewith values indicative of said network characteristic, said path having at least one portion passing through a lower-capability region and at least one portion passing through a higher-capability region, said lower-capability region being a region in which information indicative of said network characteristic may be represented by values having a first resolution, and said higher-capability region being a region in which information indicative of said network characteristic may be represented by values having a second resolution, said second resolution being greater than said first resolution, said one data unit being a data unit entering said higher-capability region, said method comprising:

monitoring a plurality of data units traversing said path and traversing from a lower-capability region to a higher-capability region;

establishing from each of said plurality of data units respective values indicative of said network characteristic, said values each having said first resolution;

determining a group value in dependence on each of a plurality of said respective values;

assigning a new value having said second resolution to said one data unit entering said higher-capability region, said new value being dependent on said group value.

Such a method is preferably performed by a node or router located at an interface between a lower-capability region and a higher-capability region, in respect of data units passing from the lower-capability region to the higher-capability region.

According to a second aspect of the present invention, there is provided an apparatus for assigning information indicative of a network characteristic to one of a plurality of data units traversing a path across a network, said data units having associated therewith values indicative of said network characteristic, said path having at least one portion passing through a lower-capability region and at least one portion passing through a higher-capability region, said lower-capability region being a region in which information indicative of said network characteristic may be represented by values having a first resolution, and said higher-capability region being a region in which information indicative of said network characteristic may be represented by values having a second resolution, said second resolution being greater than said first resolution, said one data, unit being a data unit entering said higher-capability region, said apparatus comprising:

a data unit monitor arranged to monitor a plurality of data units traversing said path and traversing from a lower-capability region to a higher-capability region, and to establish from each of said plurality of data units respective values indicative of said network characteristic, said values each having said first resolution;

group value determination means arranged to determine a group value in dependence on each of a plurality of said respective values;

value assigning means arranged to assign a new value having said second resolution to said one data unit entering said higher-capability region, said new value being dependent on said group value.

Such an apparatus is preferably a node or router located at an interface between a lower-capability region and a higher-capability region, and is preferably arranged to act in respect of data units passing from the lower-capability region to the higher-capability region.

According to preferred embodiments in relation to both of the above aspects, the network characteristic may be a dynamic network characteristic (i.e. a characteristic whose condition changes over a time period, or as the data unit to which it relates traverses the network).

The network characteristic may be an end-to-end network characteristic, and may relate to a network congestion metric such as the network congestion on the path, for example. In particular, the network characteristic may be the congestion experienced by the data unit as it traverses the network. Where the network characteristic is a congestion metric, it need not relate purely to the level of congestion on the path, however. It is also possible to look at congestion of other types of resources such as state-limited bottle-necks (for instance a Network Address Translation (NAT) middle-box), which may require different control decisions by end-systems, and therefore a different congestion signal in respect thereof.

It will be understood that specific embodiments of the invention may be applicable in relation to assigning information indicative of a variety of other types of network characteristics as well, which need not even be network congestion metrics, provided that it is possible for values indicative of the chosen network characteristic to be established from each of a plurality of data units. This is because aspects of the invention relate to or involve what is done in relation to such values, and not simply to what network characteristic the values are indicative of. The network characteristic may relate to a measure of time spent traversing a path by the data unit, for example. Other embodiments of the invention may be applicable in relation to assigning information indicative of network characteristics such as transmission cost or power consumption (which may be of relevance particularly in relation to limited-life battery-powered equipment), for example.

The lower-capability region may be "lower-capability" with respect to the higher-capability region in the sense that the network characteristic may be represented by a value having a lower number of bits when the data unit is in the lower-capability region than is possible when the data unit us in the higher-capability region. Alternatively or additionally, the lower-capability region may be "lower-capability" with respect to the higher-capability region in the sense that the network characteristic may be represented by one of a lower number of possible code-points when the data unit is in the lower-capability region than is possible when the data unit us in the higher-capability region. A region in which a network characteristic can only be represented by a single binary bit can thus be regarded as offering the lowest possible useful resolution (i.e. the code-points "0" or "1", allowing only two different conditions to be represented). A region in which the network characteristic can be represented by more than one bit offers higher resolution, as does a region in which the network characteristic can be represented by one or more digits each having more than two code-points (e.g. hexadecimal digits), because both of these allow for more than two different conditions to be represented.

The step of determining the group value may comprise determining a weighted average of the plurality of respective values. According to preferred embodiments, the step of determining the group value comprises determining an exponentially-weighted moving average of the plurality of respective values. It will be understood that the group value need not be determined as a weighted average of the plurality of respective values, and may instead be determined in a variety of other ways, provided that each involves a determination thereof in dependence on values established respectively from each of a plurality of data units (as set out in the definition above), rather than just from one data unit. Group values could also be determined from the unweighted average, or from the sum of the plurality of values (these measures being related), or from the maximum or minimum of the plurality of values, for example. The expression "group value" has been chosen in order to reflect this, and to ensure that references thereto are not confused with references to the values established respectively from each of the plurality of individual data units.

According to preferred embodiments, methods according to any of the above may be used for assigning a new value indicative of a network characteristic to a data unit traversing a path across a network and passing from a lower-capability region to a higher-capability region in situations where the one data unit in question has previously passed from a higher-capability region to the lower-capability region and has associated therewith a value indicative of the network characteristic prior to the passage of the data unit in question through the lower-capability region. Such situations may occur in relation to "tunneling", explained above, in which case the value indicative of the network characteristic prior to the passage of the data unit in question through the lower-capability region may be "encapsulated" while the data unit is in a tunnel. The new value may then be made dependent on the value indicative of the network characteristic prior to the passage of the data unit in question through the lower-capability region as well as being dependent on the group value.

In preferred embodiments, and particularly in relation to "tunneling" situations such as those outlined in the previous paragraph, the network may comprise a plurality of ingress nodes from one or more higher-capability regions to said lower-capability region. Each of the plurality of data units may then have an associated ingress indication indicating the ingress node via which that data unit entered said lower-capability region.

The one data unit in question may be one of a first plurality of data units traversing a first path through the lower-capability region from a first ingress node of the lower-capability region. There may also be other groups of data units traversing different paths through the lower-capability region, perhaps from a different ingress node of the lower-capability region. In such situations, the method may further comprise identifying a group of data units traversing the first path through the lower-capability region from the first ingress node, in order to distinguish these data units from other groups of data units. The step of determining a group value may then comprise determining the group value in dependence exclusively on respective values established from data units identified as being in the group.

As an alternative to the above, the method may further comprise identifying a group of data units each having a traffic-class indicator indicating that they are in a particular traffic-class (e.g. "guaranteed", "best-effort" etc.). In such cases, the step of determining a group value may comprise determining the group value in dependence on respective values established from data units identified as being in the group of data units of the same traffic class.

The prior art referred to above provides information on how tunneling may be used to improve the network service provided to users' traffic. Preferred embodiments of the present invention are based on a development of the tunneling concept to improve the accuracy of the information that is signalled end-to-end.

As an example, we take the specific case of end-to-end congestion signalling on a multi-bit field across a region that only supports binary congestion signaling—which we'll call the binary region. It will be understood however that embodiments of the invention need not be limited just to cases where the characteristic concerned is end-to-end congestion. It may instead be a time characteristic such as delay (upstream, or predicted downstream) or round-trip time (RTT) (perhaps using the "time-to-live" (TTL) field in the IP header), or a characteristic indicative of wireless loss due to interference etc., for example. Also, it will be understood that embodiments of the invention need not be limited just to cases wherein signalling on a multi-bit field occurs in part across a binary region. In addition to such a specific situation, other embodiments of the invention may be applicable to more general situations wherein signalling occurs across regions one of which has a lower capability or lower resolution than another, the lower capability or lower resolution region not necessarily being a binary region.

Referring to the specific case set out above, the behaviour of a typical tunneling mechanism is to encapsulate the incoming packet, so "sheltering" the multi-bit information while packets cross the binary region. The binary field of the outer header may be set to a "congestion experienced" codepoint within the binary region. On leaving the tunnel, the outer header is stripped, and the multi-bit congestion field of the packet header must be updated to reflect the congestion on the section of its path through the binary region. However, how to combine a multi-bit field and a binary field to obtain a meaningful multi-bit field is not obvious.

If it were two binary fields, then the binary field in the forwarded packet should be updated to "congestion experienced" whenever the outer header would be marked. If it were two multi-bit fields, then the multi-bit field in the forwarded packet should be updated to the sum of the inner and outer fields. If it were binary end-to-end signalling across a multi-bit signalling region, it would be a matter of setting the forwarded packet's binary field to "congestion experienced" with a probability equal to the value of the multi-bit congestion field from the outer header.

But when a multi-bit end-to-end signal is needed based on binary information, it is not meaningful to simply add the two values. The result is meant to represent the value of the upstream congestion, however if the binary field of the outer header is set to "congestion experienced", it doesn't mean congestion has reached 100% on the section of the path through the binary region. Similarly if the binary field isn't set to "congestion experienced", it doesn't mean that congestion is absolutely non-existent on the section of the path through the binary region.

One advantage of preferred embodiments is that they allow for translation of binary values seen in outer headers into meaningful multi-bit values that can be used to update the upstream congestion field in forwarded packets. This may be achieved, for instance, by keeping "per flow" a moving average on the binary marks, and using that value to update the multi-bit field, rather than the raw data.

A further advantage is that the moving average for the aggregate traffic crossing the tunnel in question can be maintained, which provides a more accurate and up-to-date estimate of the congestion level on the section of the path within the binary region.

The mechanism can be extended to cover other path characterisation metrics necessary on an end-to-end basis, such as downstream delay.

Preferred embodiments provide a mechanism to improve the accuracy of the signal for a path characteristic metric. In particular, it becomes possible to signal such a metric end-to-end, even though a section of the network path may not normally support the required signalling.

BRIEF DESCRIPTION OF THE DRAWINGS

Preferred embodiments of the present invention will now be described with reference to the appended drawings, in which.

DESCRIPTION OF PREFERRED EMBODIMENTS OF THE INVENTION

Figure 1:
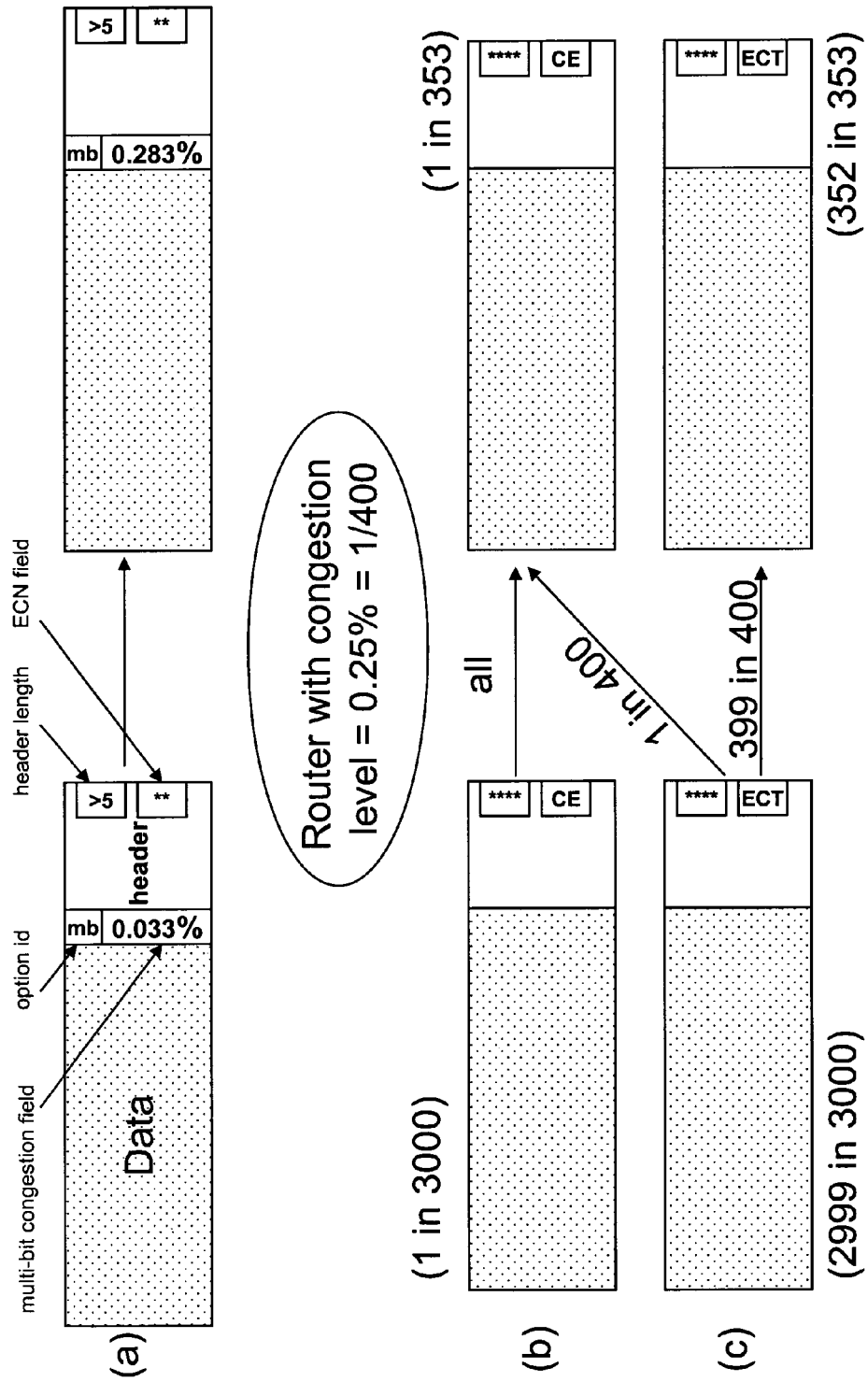
FIG. 1 illustrates single-bit and multi-bit congestion signalling.

With reference to FIGS. 1 to 6, methods for assigning information indicative of network characteristics according to preferred embodiments will be described.

We illustrate in particular how one such embodiment works when a multi-bit (or otherwise higher resolution) congestion signal is required end-to-end but one network on the path only supports single-bit (or otherwise lower resolution) congestion signalling. ECN provides the archetype of single-bit congestion signalling, while re-feedback also makes provision for multi-bit congestion signalling.

This implementation concerns the case where we wish to preserve multi-bit congestion signalling across a region that only supports single-bit congestion signalling, which we'll call a single-bit region. Routers (also known as gateways) at the edge of the single-bit region will be able to understand both single and multi-bit congestion information.

The first packet of a multi-bit flow (a flow that requires/supports multi-bit congestion signalling end to end) that has to traverse the single-bit region arrives at an ingress gateway at the edge of the region. The ingress gateway buffers the packet and looks for a suitable existing tunnel. If no tunnel exists then it will use TED to locate an appropriate tunnel endpoint across the single-bit region. If a tunnel already exists between these endpoints then the ingress gateway will add the new flow ID to this tunnel. If no tunnel exists then a new tunnel will be created. Subsequent packets from the same flow will be forwarded directly through the relevant tunnel.

As packets traverse the tunnel, they may receive a (single-bit or otherwise lower resolution) congestion mark indicating that the section of the path on which the tunnel has been established is experiencing congestion. At the egress, the packets exit the tunnel. The rate of single-bit congestion marks for the tunnel can be monitored using an exponentially weighted moving average (EWMA), or by counting the number of marked packets in a given sequence or time period, or using any of a variety of other techniques. This rate can be used to give the multi-bit value of the congestion level experienced by the network path on which the tunnel has been established, and is used to update the multi-bit congestion signal in the packets of the multi-bit flow.

We now look at each stage in more detail. Upon arriving at the ingress gateway of the single-bit or otherwise "lower-capability" region, the first few packets of a new flow may have to be buffered whilst an appropriate tunnel is identified or created. Alternatively they may have to be dropped, although it will be understood that this could be harmful to the end hosts. The ingress gateway searches through the list of existing tunnels to see if it has one for packets going to the same destination IP address. If it finds such a tunnel then it will add the new packets to that tunnel. If no suitable tunnel exists in its table then the ingress gateway sends a tunnel discovery IP packet towards the destination of the flow. Once this packet reaches the far edge of the single-bit region the egress gateway will check its origin address (the address of the ingress gateway) and will search its look-up table to see if there is an existing tunnel from the ingress to the egress gateways in question. If a suitable tunnel exists, it sends a tunnel confirmation packet back to the ingress giving details of its address. If no suitable tunnel exists, then the egress gateway will create state for a new tunnel and send a tunnel confirmation packet back to the ingress as in the previous instance. The state required is to calculate the estimate of the congestion level experienced by the path over which the new tunnel has been set up.

Once the tunnel confirmation packet has returned to the ingress the packets from the flow can be encapsulated into the tunnel. This is done by adding an outer IP header with the address of the tunnel ingress as source address and the address of the tunnel egress as destination address.

At the egress the gateway will receive all the packets for flows through each tunnel. It will decapsulate the original packets by stripping off the outer IP header, making sure to update the congestion level estimate according to the appropriate formula, from C' to C:

If the outer header contains a single-bit congestion mark then $C=C'+a\cdot(1-C')$ Else $C=(1-a)\cdot C'$ Before forwarding the packet, the egress gateway updates the value of the multi-bit field on the original packet from P' to P according to the congestion level estimate C:

$$P=1-(1-P')\cdot(1-C)$$

where P' is the value of the multi-bit congestion signal field when the packet arrives at the ingress, C is the congestion estimate for the tunnel and P is the updated value when it leaves the egress gateway.

In some cases this step can be suitably approximated by using the following formula instead $$P=P'+C$$

The original packet can then be forwarded to its destination by the gateway.

A more detailed explanation of a preferred embodiment will now be provided in conjunction with FIGS. 1 to 6.

FIG. 1 illustrates binary and multi-bit congestion signalling. Both flows travel on a path that starts with a section congested to a level of $p_1=0.033\%=1/3000$ before reaching a router congested to a level $p_2=0.25\%=1/400$. The illustration shows the state of the congestion fields before and after the router in the case of multi-bit congestion signalling (see (a)), and in the case of binary signalling (see (b) and (c)).

FIG. 1(*a*): When multi-bit signalling is used, the source sends the packet with a header length set to a value higher than 5, one of the option fields exhibits an option id "mb" for multi-bit congestion signalling, and there is a multi-bit congestion field that indicates the level of congestion of the section of the path so far. The source sets the multi-bit congestion field to 0. When it arrives at the router, the multi-bit field in the option carries the value $p_1$ reflecting the level of congestion on the upstream section of the path. The router identifies that the packet requires multi-bit congestion signalling (because one of the options id is set to "mb"), and therefore combines its local level of congestion to the value of the upstream value before updating the multi-bit congestion field to $1-(1-p_1)(1-p_2)$ before forwarding the packet.

FIGS. 1 (*b*) and (*c*): When binary congestion signalling is used, the exact value of the congestion level is not indicated in every packet. Instead, packets are marked in proportion to the congestion level. In the case of ECN, the source generates all packets with the ECN field set to "ECT". A flow crossing a section of path with congestion $p_1$ will have in average one packet in every $(1/p_1)$ arriving at the router with an ECN field set to "CE", all other packets arriving with a field still set to the ECT codepoint. The router identifies that the packet requires binary signalling using ECN because the ECN field is set to either "ECT" or "CE". CE packets are forwarded without alteration, as they have already been marked upstream of the router. On the other hand, for each ECT packet, the router changes the ECN codepoint from ECT to CE with a probability $p_2$. As a result, about one in $(1/p_2)$ ECT packets is forwarded as a CE packet, all other ECT packets being forwarded without alteration.

The proportion of CE packets leaving the router is therefore the following:

$$p_1+(1-p_1)\cdot p_2=1-(1-p_1)+(1-p_1)\cdot p_2=1-(1-p_1)\cdot (1-p_2)$$

With $p_1=\frac{1}{3000}$ and $p_2=\frac{1}{400}$:
  packets with a multi-bit congestion field will be forwarded with a field set to about 0.283%
  ECN capable flows will be forwarded with about one in 353 (=1/0.283%) CE packets Note that both signalling mechanisms can be performed at the same time.

Figure 2:
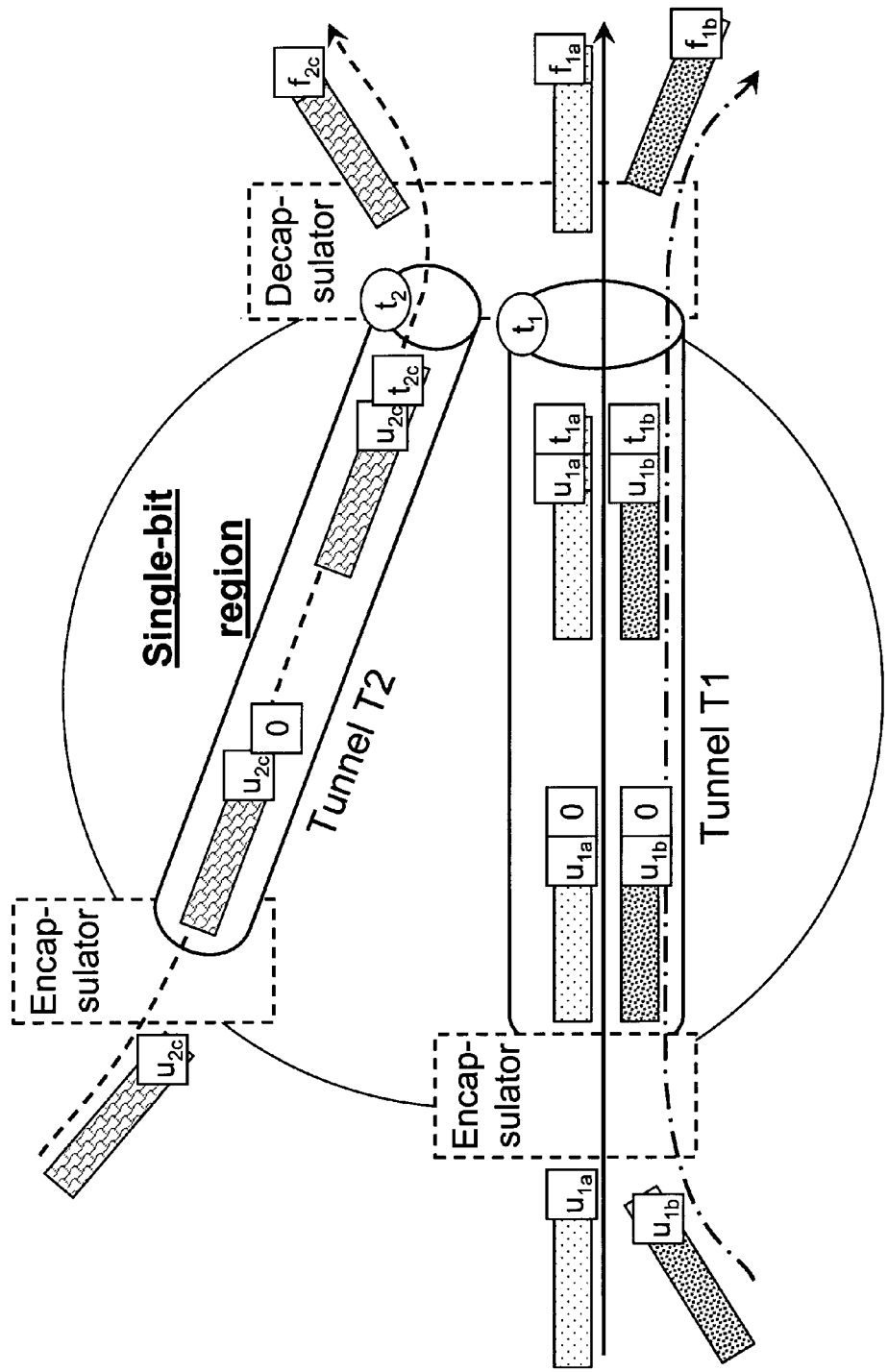
FIG. 2 illustrates tunneling through a single-bit region.

FIG. 2 shows a network where tunneling is operated. Tunnels T1 and T2 have been established. Flows a and b travel through Tunnel T1 while flow c travels through Tunnel T2. Packets arrive at the encapsulator with their upstream header containing a congestion signal $u_{ij}$ indicating the level of congestion on the upstream path to the network (where i is the index for the tunnel (1, 2) and j is the index for the flow (a,b,c). When packets are encapsulated, a second congestion field is used in the outer header which is set to zero when it is generated by the encapsulator. The encapsulated packet reaches the decapsulator with a value t_ij reflecting the level of congestion across the tunnel. The value of the congestion field in the inner header has remained unchanged across the tunnel. On reaching the decapsulator, the value of the congestion field in the outer header t_ij is used to update the estimate t of the congestion level in the relevant tunnel, and the outer header is stripped off the packet. The congestion field in the outer header is updated to $f_{ij}$ to reflect the combined value of the congestion level $u_{ij}$ upstream of the tunnel and the congestion $t_i$ across the tunnel, before the packet is forwarded.

Figure 3:
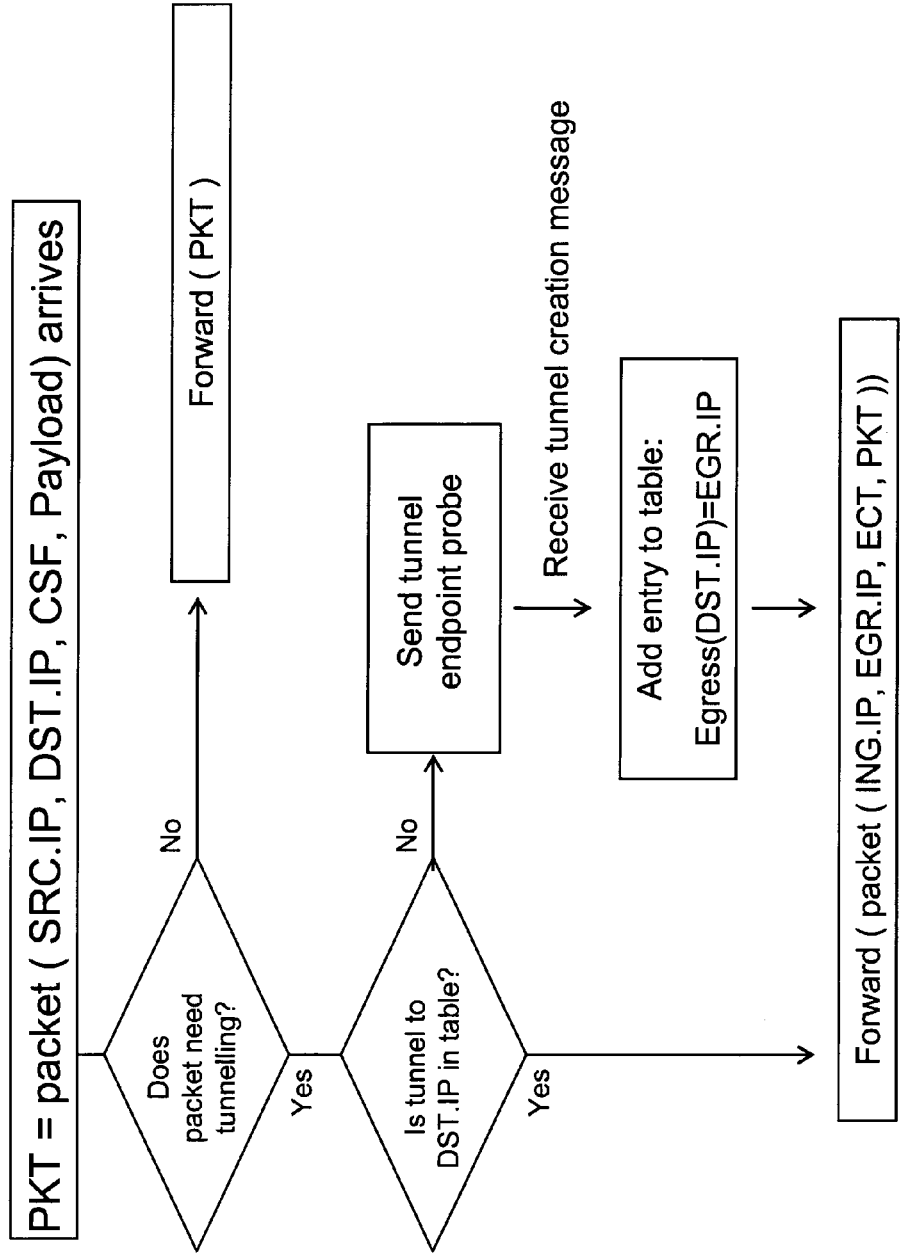
FIG. 3 is a flow chart illustrating the process performed at an encapsulator at the ingress node of a tunnel.

In summary of the above:
  the estimate may be established from congestion signals from all flows across the tunnel
  the estimate per tunnel may be used to update the congestion signal in every packet as if it were the congestion experienced by a single router FIG. 3 shows the process followed to assign the packet to a tunnel. The packet arrives at the encapsulator with the following information:
  source address=IP address of the source of the flow
  destination address=IP address of the destination of the flow
  a congestion signalling field which may be binary or multi-bit
  other suitable header fields and payload The encapsulator determines whether the packet needs tunneling by analysing the header. If the congestion signalling field is not supported across the network ahead, the packet needs encapsulating, otherwise it is forwarded normally. The encapsulator maintains a look-up table associating destination addresses of the flows that are tunneled. If the destination address of the packet isn't yet in the table, the encapsulator sends a tunnel endpoint probe, such as a packet with a special protocol number for instance addressed to the IP destination of the flow to be dealt with. A decapsulator on the path between the encapsulator and the destination will intercept the probe, and reply to the encapsulator with a message specifying that packets to the IP destination in question should be sent to a tunnel towards its own IP address. On receiving the reply, the encapsulator updates its table, to associate the destination IP address with a tunnel towards the decapsulator's IP address. The encapsulator can now generate the encapsulated packet:
  source address=IP address of the encapsulator
  destination address=IP address of the decapsulator
  ECN field=ECT
  other suitable header fields
  for payload, the original packet If a tunnel existed towards the destination IP address, the look-up table would have returned the IP address of the relevant decapsulator and the encapsulator could have forwarded the encapsulated packet.

Figure 4:
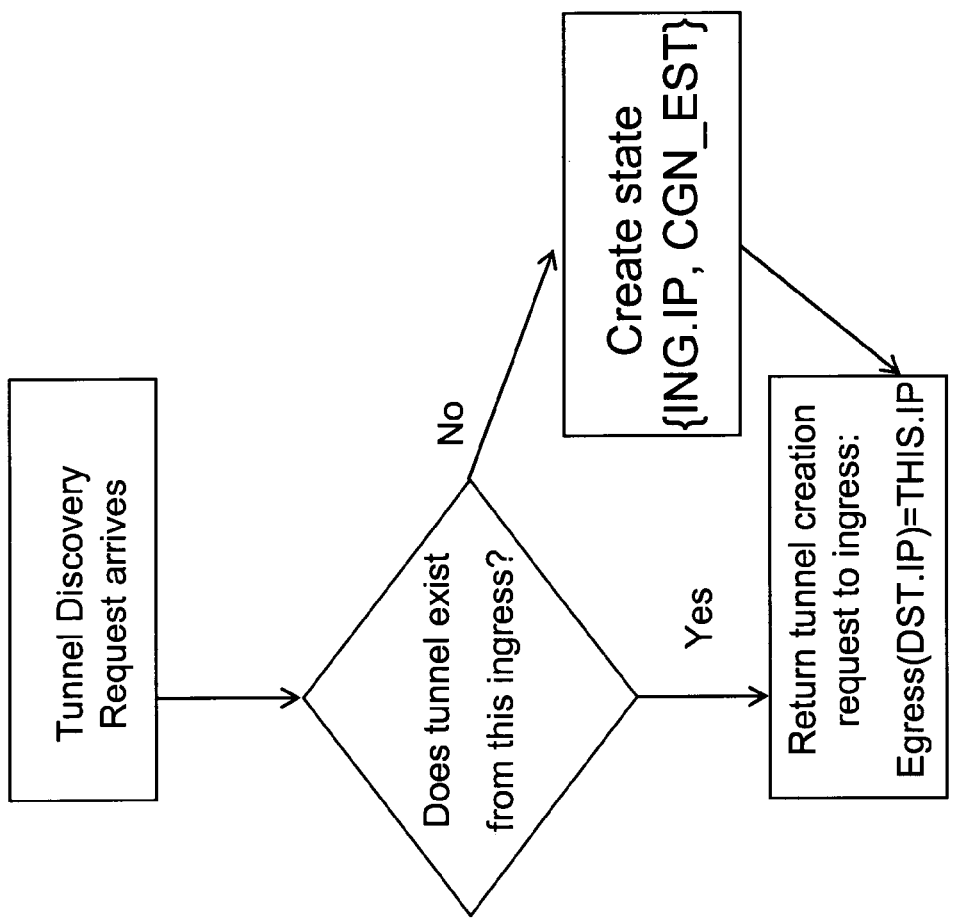
FIG. 4 is a flow chart illustrating the tunnel discovery process performed at a decapsulator at the egress node of a tunnel.

FIG. 4 shows the process operated by the decapsulator when it intercepts a tunnel endpoint probe. The decapsulator maintains a table of all the tunnels established towards it, each entry containing at least the IP address of the encapsulator where the tunnel originates, and an estimate of the congestion along the path of the tunnel. On receiving a tunnel endpoint probe, the decapsulator returns its IP address to the originating encapsulator, and adds an entry to the table if none existed.

Figure 5:
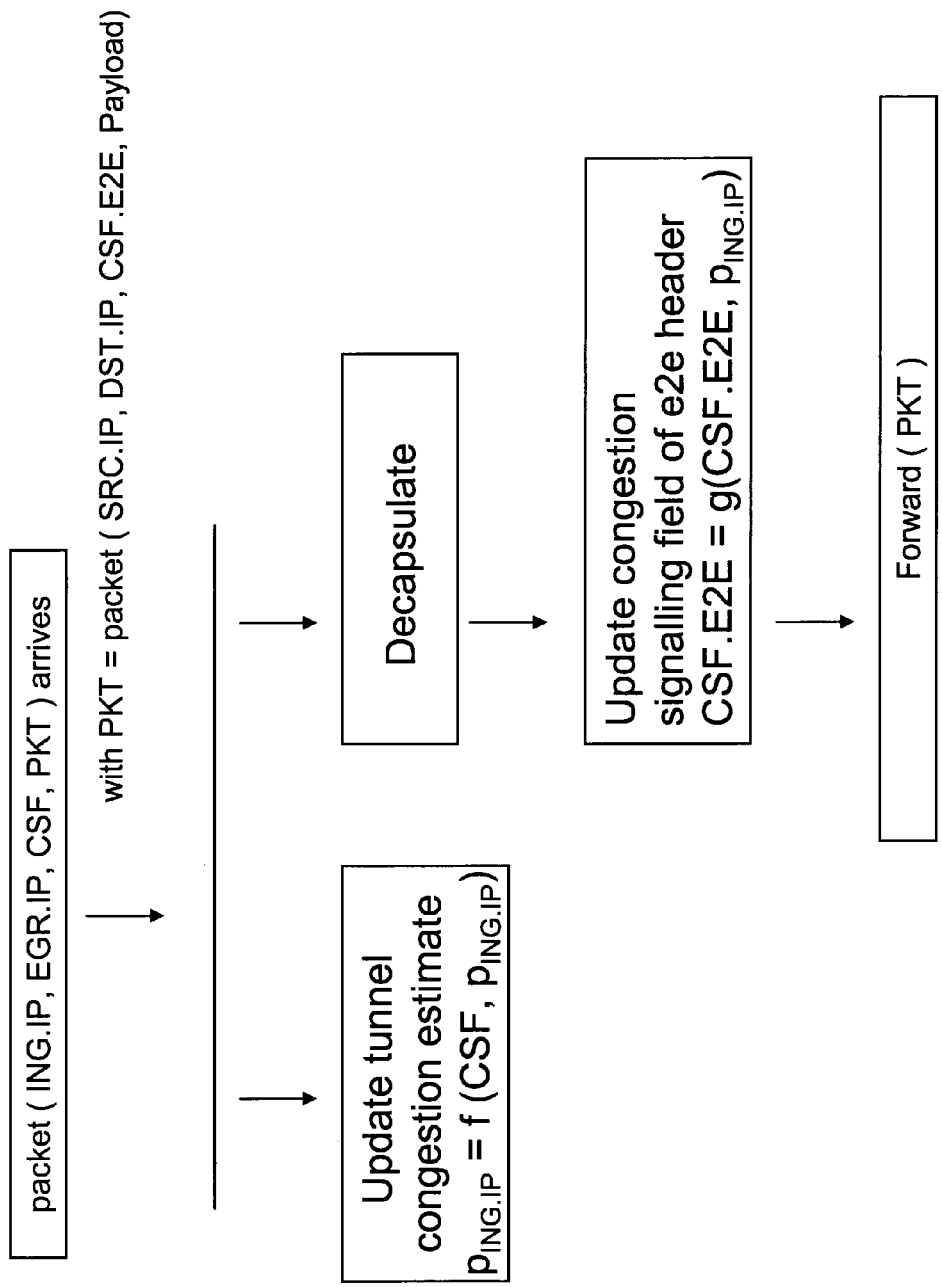
FIG. 5 is a flow chart illustrating a process according to a preferred embodiment of the invention performed at an the egress node of a tunnel.

FIG. 5 shows what happens when a packet reaches the decapsulator. Two main processes are operated:
  the congestion estimate for the tunnel is updated.
  the congestion field in the encapsulated packet is updated.

The two processes may be handled in parallel if sufficient traffic flows through the tunnel, but they should preferably be run in sequence, firstly the updating of the estimate of the congestion level in the tunnel, and secondly the updating of the congestion field in the header of the packet to be forwarded.

In order to update the congestion estimate for the tunnel, the decapsulator extracts the value of the congestion field in the outer header and combines it with the existing estimate, for instance, by means of a moving average.

In order to update the congestion field in the packet to be forwarded, the packet is decapsulated, and the congestion field in the original packet's header is updated by combining its value with the congestion estimate for the tunnel, as would happen if the congestion experienced while crossing the tunnel was that of a single router.

Figure 6:
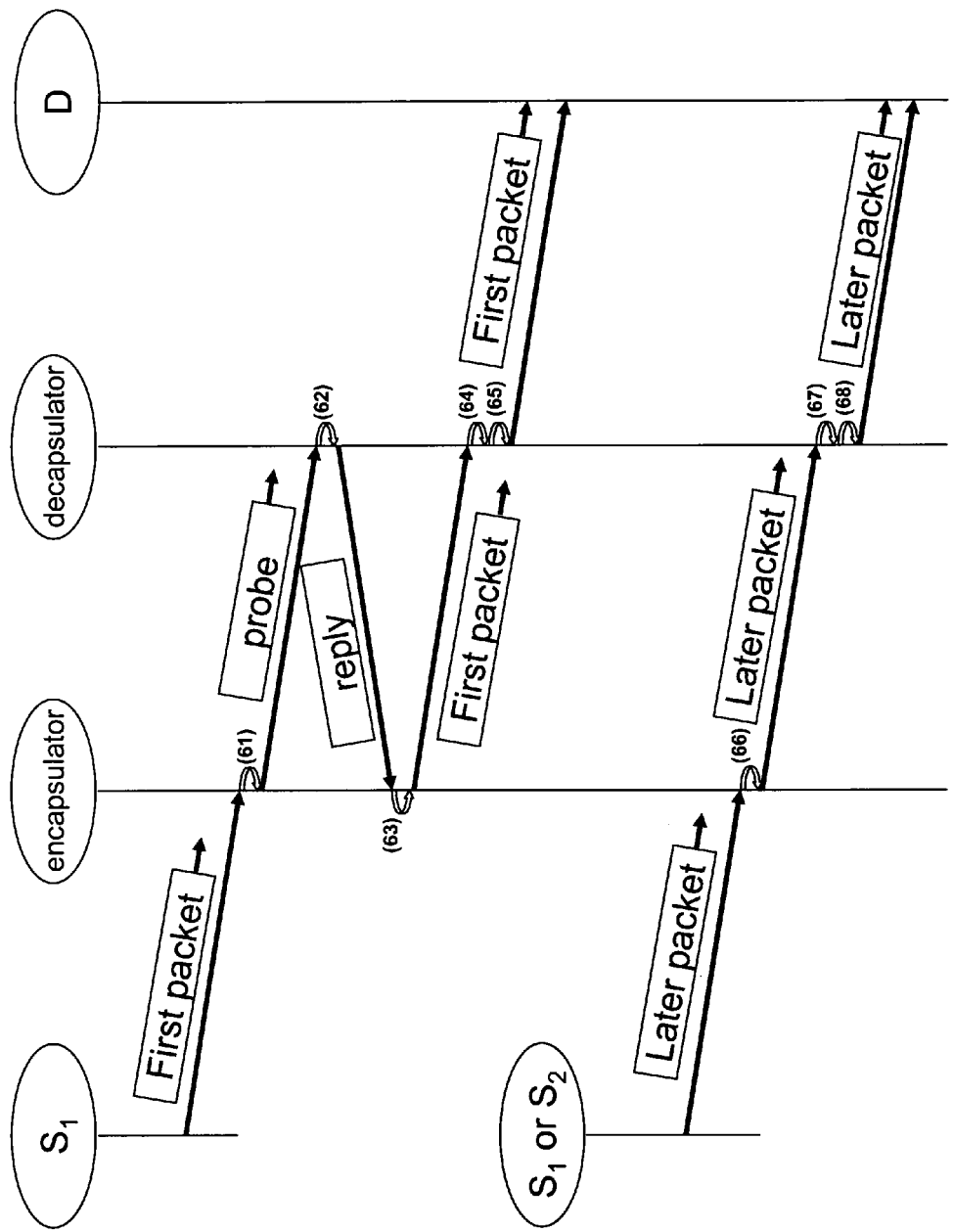
FIG. 6 illustrates the sequence of events as a first packet and then a later packet traverse paths across a network where the paths include an IP tunnel portion.

FIG. 6 shows the sequence of events across the network. When a packet reaches an encapsulator that has no tunnel established towards the destination address (step 61), the encapsulator sends a probe towards the destination. The decapsulator intercepts the probe (step 62) and returns a tunnel creation message indicating its own IP address should be used as tunnel endpoint to reach the destination IP address in question. When the reply reaches the encapsulator, it can update its tunnel table, encapsulate the data packet and send it across the tunnel (step 63). When the packet arrives at the decapsulator, the congestion estimate for the tunnel is updated (step 64), the packet is decapsulated, its congestion field updated (step 65), and it is forwarded to the destination.

When a later packet to the same destination IP address reaches the encapsulator, whether it is from the same source as the first packet to that destination or not, the IP address of the relevant decapsulator for that IP address already appears in the tunnel's look-up table, and the encapsulator can send the packet over the relevant tunnel (step 66) without having to probe for the decapsulator again. When the packet arrives at the decapsulator, operations are the same as for the first packet: the congestion estimate for the tunnel is updated (step 67), the packet is decapsulated, and its congestion field is updated (step 68) before it is forwarded.

The following recommendations relate to setting the parameters of the EWMA (weight a, seeding value for the congestion level estimate C). According to preferred embodiments, the weight 'a' should preferably be set to a value of the same order as the smallest expected congestion level, to prevent the estimate from dropping to 0 too quickly between marks. Meanwhile, the seeding value for the congestion level estimate should preferably be set to a value of the order of the highest expect congestion level.

An alternative mechanism to obtain the estimate of the congestion level would be to maintain an EWMA on the number of packets received between subsequent marks, which would characterise the inverse of the congestion level.

An advantage of this embodiment is that it allows a network operator to support multi-bit congestion signalling by having only its gateways contribute to the signal, rather than each of the nodes on the path. Without this, the network operator may only be able to support single-bit congestion signalling, which is far less accurate. If $p_e$ is the congestion level on the end-to-end path, $p_t$ is the congestion level along the path of the tunnel, and n is the number of recent packets from the flow, then the accuracy of the end-to-end congestion signal (as shown by the variance of its expectation) is:

$p_e \cdot (1-p_e)$ if the single-bit network doesn't implement the present technique $p_t \cdot (1-p_t)/n$ if the single-bit network does implement the present technique Another potential advantage is that the accuracy of the signal may further be improved by establishing the congestion level estimate across the packets of all the flows in the tunnel, rather than for each flow individually. This further reduces the variance down to $p_t \cdot (1-p_t)/\Sigma n_f$ where $n_f$ is the number of recent packets from flow f=1 ... F. This effect is especially beneficial to light flows traversing tunnels used by many heavy flows.

The actual location of tunnel endpoints and creation of the tunnel may be adapted from existing techniques.

In another arrangement, the network operator of the single-bit domain may send probes to get an exact value of the congestion level.

The invention claimed is:

1. A method for assigning information indicative of a network characteristic to one of a plurality of data units traversing a path across a network, said data units having associated therewith values indicative of said network characteristic, said path having at least one portion passing through a lower-capability region and at least one portion passing through a higher-capability region, said lower-capability region being a region in which information indicative of said network characteristic may be represented by values having a first resolution, and said higher-capability region being a region in which information indicative of said network characteristic may be represented by values having a second resolution, said second resolution being greater than said first resolution, said one data unit being a data unit entering said higher-capability region, said method comprising:

monitoring a plurality of data units traversing said path and traversing from a lower-capability region to a higher-capability region;

establishing from each of said plurality of data units respective values indicative of said network characteristic, said values each having said first resolution;

determining a group value in dependence on each of a plurality of said respective values;

assigning a new value having said second resolution to said one data unit entering said higher-capability region, said new value being dependent on said group value.

2. A method according to claim 1 wherein said network characteristic is a dynamic network characteristic.

3. A method according to claim 1 wherein said network characteristic is an end-to-end network characteristic.

4. A method according to claim 1 wherein said network characteristic relates to network congestion on said path.

5. A method according to claim 4 wherein said network characteristic is congestion experienced by a data unit.

6. A method according to claim 1 wherein said network characteristic relates to a measure of time spent traversing said path by a data unit.

7. A method according to claim 1 wherein the lower-capability region is a region permitting said network characteristic to be represented by an n-bit value, where n is an integer, and the higher-capability region is a region permitting said network characteristic to be represented by a value having more than n bits.

8. A method according to claim 7 where n is 1.

9. A method according to claim 1 wherein the lower-capability region is a region permitting said network characteristic to be represented by one of $C_L$ possible code-points, where $C_L$ is an integer, and the higher-capability region is a region permitting said network characteristic to be represented by one of $C_H$ possible code-points, where $C_H$ is an integer larger than $C_L$.

10. A method according to claim 9 where $C_L$ is 2.

11. A method according to claim 1 wherein determining said group value comprises determining a weighted average of said plurality of respective values.

12. A method according to claim 1 wherein determining said group value comprises determining an exponentially-weighted moving average of said plurality of respective values.

13. A method according to claim 1 wherein determining said group value comprises determining a maximum or minimum of said plurality of respective values.

14. A method according to claim 1 for assigning a new value indicative of a network characteristic to a data unit traversing a path across a network and passing from a lower-capability region to a higher-capability region, said one data unit having previously passed from a higher-capability region to said lower-capability region and having associated therewith a value indicative of said network characteristic prior to the passage of said one data unit through said lower-capability region, said new value being dependent on said value indicative of said network characteristic prior to the passage of said one data unit through said lower-capability region as well as being dependent on said group value.

15. A method according to claim 1 wherein said network comprises a plurality of ingress nodes from one or more higher-capability regions to said lower-capability region.

16. A method according to claim 15 wherein each of said plurality of data units has an associated ingress indication indicating the ingress node via which that data unit entered said lower-capability region.

17. A method according to claim 1 wherein said one data unit is one of a first plurality of data units traversing a first path through said lower-capability region from a first ingress node of said lower-capability region.

18. A method according to claim 17 wherein said method further comprises identifying a group of data units traversing said first path through said lower-capability region from said first ingress node, and said step of determining a group value comprises determining said group value in dependence on respective values established from data units identified as being in said group.

19. A method according to claim 1 wherein said method further comprises identifying a group of data units each having a traffic-class indicator indicating, that they are in a particular traffic-class, and said step of determining a group value comprises determining said group value in dependence on respective values established from data units identified as being in said group.

20. An apparatus comprising:
a router configured to:
  assign information indicative of a network characteristic to one of a plurality of data units traversing a path across a network, said data units having associated therewith values indicative of said network characteristic, said path having at least one portion passing through a lower-capability region and at least one portion passing through a higher-capability region, said lower-capability region being a region in which information indicative of said network characteristic may be represented by values having a first resolution, and said higher-capability region being a region in which information indicative of said network characteristic may be represented by values having a second resolution, said second resolution being greater than said first resolution, said one data unit being a data unit entering said higher-capability region;
  monitor a plurality of data units traversing said path and traversing from a lower-capability region to a higher-capability region, and establish from each of said plurality of data units respective values indicative of said network characteristic, said values each having said first resolution;
  determine a group value in dependence on each of a plurality of said respective values; and
  assign a new value having said second resolution to said one data unit entering said higher-capability region, said new value being dependent on said group value.

* * * * *